United States Patent
Nagata

(10) Patent No.: US 6,886,969 B2
(45) Date of Patent: May 3, 2005

(54) ROOM LAMP FOR VEHICLE

(75) Inventor: Satoshi Nagata, Kanagawa (JP)

(73) Assignee: Ichikoh Industries, Ltd., Tokyo (JP)

( * ) Notice: Subject to any disclaimer, the term of this patent is extended or adjusted under 35 U.S.C. 154(b) by 154 days.

(21) Appl. No.: 10/091,587

(22) Filed: Mar. 7, 2002

(65) Prior Publication Data

US 2002/0126495 A1 Sep. 12, 2002

(30) Foreign Application Priority Data

Mar. 9, 2001 (JP) .................................... 2001-066697

(51) Int. Cl.$^7$ ............................................. B60Q 1/00
(52) U.S. Cl. .................... 362/488; 362/490; 362/549; 362/265; 362/493
(58) Field of Search .................... 362/488, 490, 362/493, 548, 549, 365, 479

(56) References Cited

U.S. PATENT DOCUMENTS

| | | | |
|---|---|---|---|
| 6,056,423 A | 5/2000 | Takano et al. | 362/488 |
| 6,234,558 B1 * | 5/2001 | Curtindale | 296/97.9 |
| 6,543,918 B1 * | 4/2003 | Nagata | 362/488 |
| 2001/0022730 A1 | 9/2001 | Nagata et al. | 362/490 |

FOREIGN PATENT DOCUMENTS

| | | |
|---|---|---|
| JP | 11-115628 | 4/1999 |
| JP | 11-123985 | 5/1999 |
| JP | 2001-97112 | 1/2001 |
| JP | 2001-30827 | 2/2001 |
| JP | 2001-30828 | 2/2001 |
| JP | 2001-260747 | 9/2001 |

\* cited by examiner

Primary Examiner—Sandra O'Shea
Assistant Examiner—Bertrand Zeade
(74) Attorney, Agent, or Firm—Foley & Lardner LLP

(57) ABSTRACT

An inclined engagement surface of an elastic engagement hook is elastically engaged with an engaged section in a state of being inclined with respect to a roof panel. As a result, it is possible to absorb an error of a three-dimensional relative positional relation between the elastic engagement hook and the engaged section. That is, the error of the relative positional relation in two directions (an X direction and a Y direction in FIG. 5B) can be absorbed by a deflection of the inclined engagement surface, and the error of the relative positional relation in remaining one direction (a Z direction in FIG. 5B) can be absorbed by a slip between the inclined engagement surface and the engaged section.

9 Claims, 5 Drawing Sheets

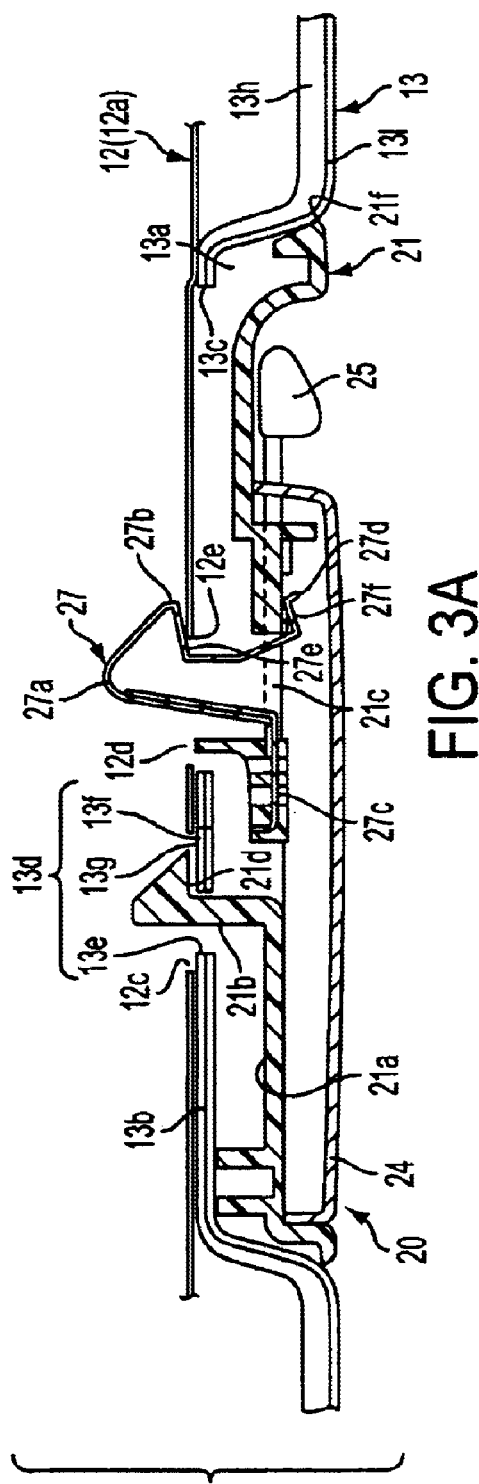
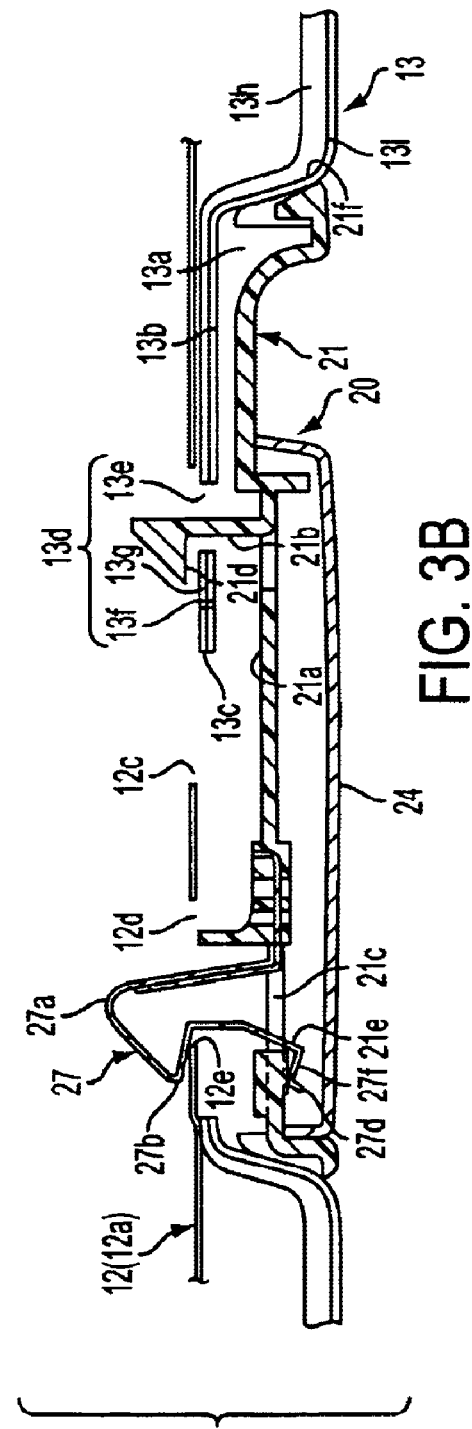
FIG. 3A
FIG. 3B

US 6,886,969 B2

ROOM LAMP FOR VEHICLE

FIELD OF THE INVENTION

The present invention relates to a room lamp for a vehicle in which a lamp main body and a roof trim are temporarily fixed so as to be modularized, and the lamp main body and the roof trim are integrally fully fixed to a roof panel.

BACKGROUND OF THE INVENTION

As this kind of room lamp for a vehicle, for example, there are a room lamp for a vehicle previously invented by the inventor of this application (Japanese Patent Application No. 11-207799 (Japanese Patent Application Laid-Open (JP-A) No. 2001-30827), Japanese Patent Application No. 11-207800 (JP-A No. 2001-30828), Japanese Patent Application No. 11-276673 (JP-A No. 2001-97112), Japanese Patent Application No. 2000-79321 (JP-A No. 2001-260747) and the like).

The room lamp for the vehicle is provided with a lamp main body, a plurality of engagement hooks protruded from the lamp main body, and a plurality of elastic engagement hooks. Further, the room lamp for the vehicle is structured such that at first a plurality of the engagement hooks are respectively engaged with a plurality of engaged sections formed in a roof trim, whereby the lamp main body is temporarily fixed to the roof trim and the lamp main body and the roof trim are modularized. Next, in an assembling line for a motor vehicle, a plurality of the elastic engagement hooks are respectively elastically engaged with a plurality of engaged sections formed in the roof panel, whereby the lamp main body is fully fixed to the roof panel so as to be integrally formed with the roof trim.

As mentioned above, the room lamp for the vehicle is provided with an excellent assembling property such that the lamp main body can be easily positioned to the roof panel, a supporting structure of the roof trim to the roof panel becomes simple, and the like. Further, the room lamp for the vehicle can reduce a number of steps for an assembling (fixing) operation in the assembling line of the motor vehicle.

SUMMARY OF THE INVENTION

It is an object of this invention to provide a room lamp for a vehicle which does not require strictly secure a three-dimensional relative positional relation between an elastic engagement hook and an engaged section, and can fully fix a lamp main body to a roof panel easily and securely so as to be integrally formed with a roof trim.

According to one aspect of the present invention, in order to achieve the object mentioned above, an inclined engagement surface which is elastically engaged with an engaged section of a roof panel in a state of being inclined with respect to the roof panel is formed in an elastic engagement hook.

As a result, according to this aspect of the present invention, since the inclined engagement surface of the elastic engagement hook is elastically engaged with the engaged section in a state of being inclined with respect to the roof panel, it is possible to absorb an error of the three-dimensional relative positional relation between the elastic engagement hook and the engaged section. That is, the error of the relative positional relation in two directions (an X direction and a Y direction in FIG. 5(B)) can be absorbed by a deflection of the inclined engagement surface, and the error of the relative positional relation in remaining one direction (a Z direction in FIG. 5(B)) can be absorbed by a slip between the inclined engagement surface and the engaged section. Accordingly, the inclined engagement surface can be easily and securely brought into contact with the engaged section without strictly securing the three-dimensional relative positional relation between the elastic engagement hook and the engaged section.

Accordingly, it is possible to fully fix the lamp main body to the roof panel easily and securely so as to be integrally formed with the roof trim, in a fully fixing operation in which an operator can not visually observed due to the structure of the ceiling of the vehicle body or the like.

Other objects and features of this invention will become understood from the following description with reference to the accompanying drawings.

BRIEF DESCRIPTION OF THE DRAWINGS

FIG. 3A is a cross sectional view along a line A—A in FIG. 2;

FIG. 3B is a cross sectional view along a line B—B in FIG. 2;

DETAILED DESCRIPTION

A description will be given below of an example of an embodiment of a room lamp for a vehicle according to the present invention with reference to the accompanying drawings. In this instance, in the specification, an upper section or an upper surface means an upper section or an upper surface at a time of assembling a lamp main body in a ceiling of a vehicle body, and a lower section or a bottom surface means a lower section or a bottom surface at a time of assembling the lamp main body in the ceiling of the vehicle body.

The ceiling of the vehicle body is generally constituted by a roof panel corresponding to a ceiling panel for an exterior and a roof trim 13 (a molded ceiling) corresponding to a ceiling panel for an interior. Further, the roof panel is generally, as shown in FIG. 4, constituted by an outer wall (not shown) positioned in an outer side of the vehicle, an inner wall 11 positioned in an inner side of a passenger room rather than the outer wall, and a mounting panel 12 (which may be commonly used as a reinforcing panel in some instances) which mounts a room lamp positioned between the inner wall 11 and the roof trim 13.

Figure 1:
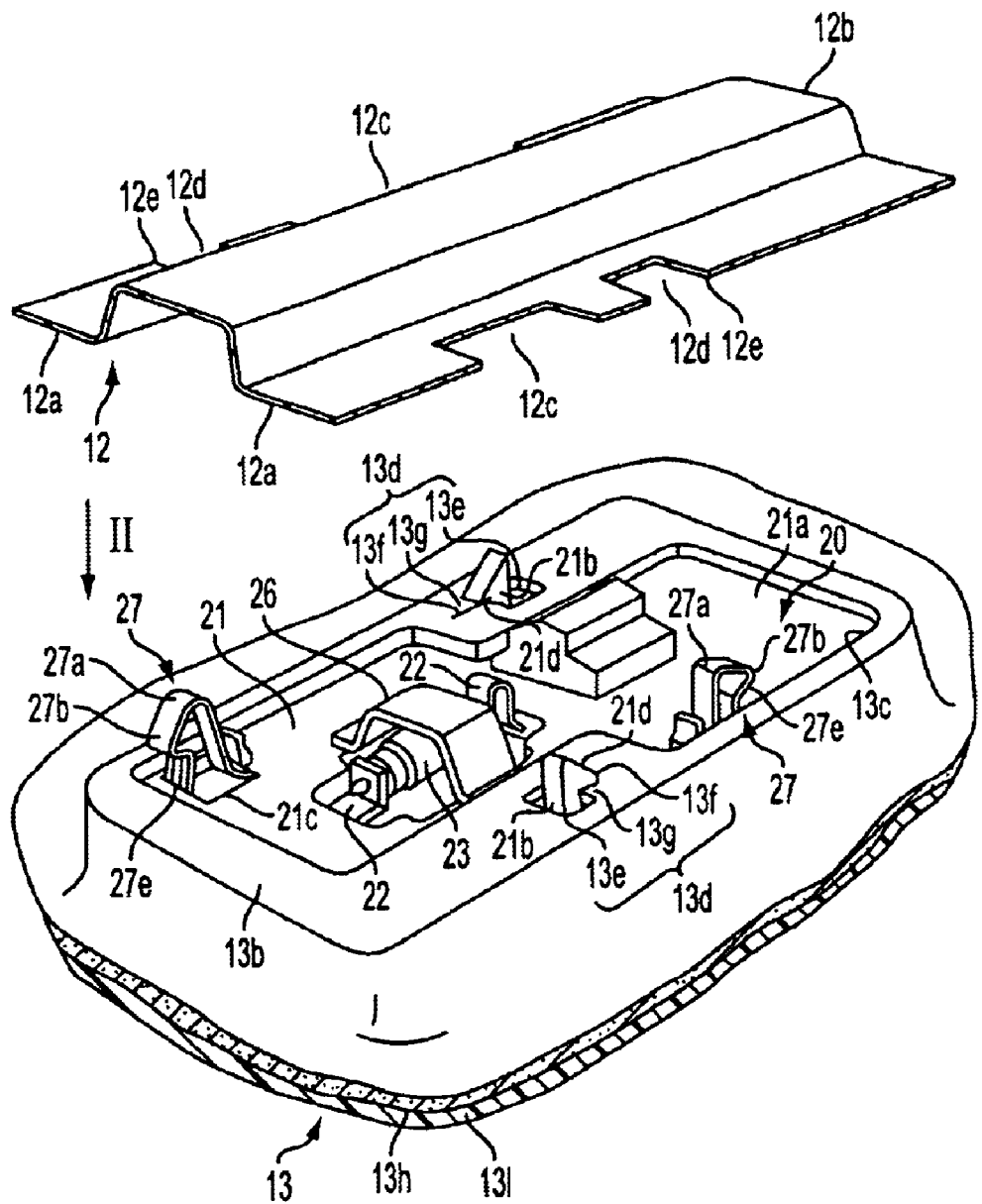
FIG. 1 is a perspective view which shows a room lamp for a vehicle according to an embodiment of the present invention in a state before being fully fixed as seen from a side of a ceiling of a vehicle body.

A peripheral edge section of the outer wall and a peripheral edge section of the inner wall 11 are bonded according to a spot welding or the like. The mounting panel 12 is, as shown in FIG. 1, constituted by a pair of flanges 12a extending rightward and leftward (or forward and backward) of the vehicle body, and a trapezoidal section 12b extending between the flanges 12a. The mounting panel 12 is fixed to the inner wall 11.

An engagement hook inserting recess section 12c and an elastic engagement hook inserting recess section 12d are formed in the flange 12a in a notched manner. Further, one edge section of the elastic engagement hook inserting recess section 12d forms an engaged section 12e.

As shown in FIGS. 3 and 4, a lamp receiving recess section 13a open to an inner side of the passenger room is formed in the roof trim 13. An opening 13c is formed in a bottom section 13b of the lamp receiving recess section 13a. Further, an engaged section 13d is formed in the bottom section 13b. The engaged section 13d is constituted by an engagement hook through hole 13e, a slit 13f communicated with the engagement hook through hole 13e, and a peripheral section 13g of the slit 13f.

Further, the roof trim 13 is constituted by a base member 13h positioned in a side of the inner wall 11, and a mounting member 13i positioned in an inner side of the passenger room. The roof trim 13 includes a comparatively hard roof trim 13 and a comparatively soft roof trim 13. When there is employed the comparatively hard roof trim 13, for example, foamed urethane is employed for a material of the base member 13h, on the contrary, for example, a felt, a resin, a non woven fabric or the like is employed for a material of the mounting member 13i, respectively. Further, when there is employed the comparatively soft roof trim 13, for example, the foamed urethane is employed for a material of the base member 13h, and on the contrary, for example, a sheet fabric or the like is employed for a material of the mounting member 13i, respectively. However, the material itself is not particularly limited.

A room lamp 20 (a lamp main body) is provided in the ceiling of the vehicle body structured in the manner mentioned above. The room lamp 20 is structured such as to be turned on and off, for example, on the basis of an interlock with an opening and closing operation of a door of the vehicle body, or manually turned on and off, in correspondence to a contact point selecting state of the switch.

Figure 2:
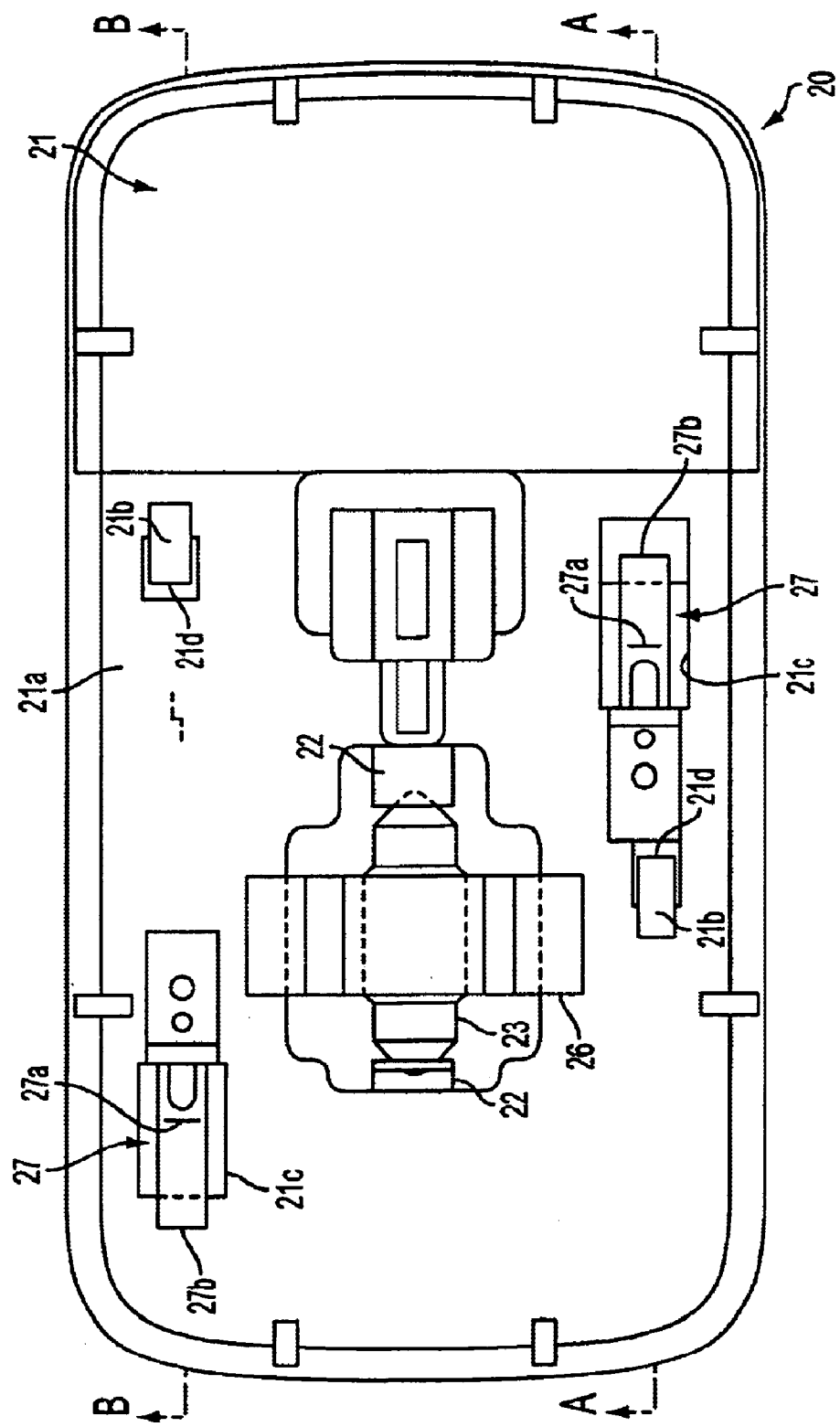
FIG. 2 is a view as seen from an arrow II in FIG. 1.

The room lamp 20 is, as shown in FIGS. 1 to 3, provided with a lamp housing 21, a bulb 23 attached to the lamp housing 21 via a pair of terminals 22, a lens 24 transmitting a lighting flux of light emitted from the bulb 23, a switch 25 selecting the lighting state of the bulb 23, and a reflector 26 covering an upper section of the bulb 23 and commonly serving as a shade.

A contact section 21f pressed against the roof trim 13 is formed in a periphery of the lamp housing 21.

A pair of engagement hooks 21b are integrally protruded on an upper surface 21a of the lamp housing 21 so as to protrude upward. A pair of engagement hooks 21b are arranged so as to be substantially divided on a diagonal line on the basis of a center (or a center of gravity) of the lamp housing 21. Lance-shaped front ends 21d opposing to each other in a side elevational view are formed in a pair of engagement hooks 21b.

Further, two holding openings 21c are formed on the upper surface 21a of lamp housing 21. One ends 27c of a pair of elastic engagement hooks 27 are respectively inserted and fixed to edge sections in one wall surfaces of these two holding openings 21c.

Each of a pair of elastic engagement hooks 27 is constituted by a fixed end section of the one end 27c, a free end section of another end 27d which is free with respect to the lamp housing 21, and a leaf spring in which a circular arc-shaped upper end 27a and a lance-shaped front end section 27b disposed in a middle thereof are bent. The upper end 27a, the front end section 27b and the another end 27d can elastically deform with respect to the one end 27c.

A pair of elastic engagement hooks 27 are protruded upward from the upper surface 21a of the lamp housing 21. A pair of elastic engagement hooks 27 are arranged so as to be substantially divided on a diagonal line on the basis of the center of the bulb 23. The lance-shaped front end sections 27b of a pair of elastic engagement hooks 27 move apart from each other in a side elevational view.

Inclined engagement surfaces 27e elastically engaging with the engaged sections 12e in a state of being inclined with respect to the mounting panel 12 are formed in a pair of elastic engagement hooks 27. The inclined engagement surfaces 27e are formed so as to be bent obliquely downward from the front end section 27b.

A drop-out preventing piece 27f brought into contact with the lamp housing 21 at a time when the inclined engagement surface 27e is elastically engaged with the engaged section 12e of the mounting panel 12 is formed near the another end 27d of each of a pair of elastic engagement hooks 27. The drop-out preventing piece 27f is bent obliquely downward from the inclined engagement surface 27e.

A contact section 27g brought into contact with the lamp housing 21 at a time when the drop-out preventing piece 27f is brought into contact with the lamp housing 21 is formed in a side of the another end 27d of the drop-out preventing piece 27f. Further, an inclined section 27h inclined with respect to the lamp housing 21 is formed between the contact section 27g and the drop-out preventing piece 27f. The inclined section 27h is bent obliquely upward from the drop-out preventing piece 27f. Further, the contact section 27g is formed in a corner section bent obliquely downward from the inclined section 27h.

The room lamp for the vehicle according to this embodiment is structured in the manner mentioned above, and a description will be given below of a fixing operation to the ceiling of the vehicle body.

Figure 4A:
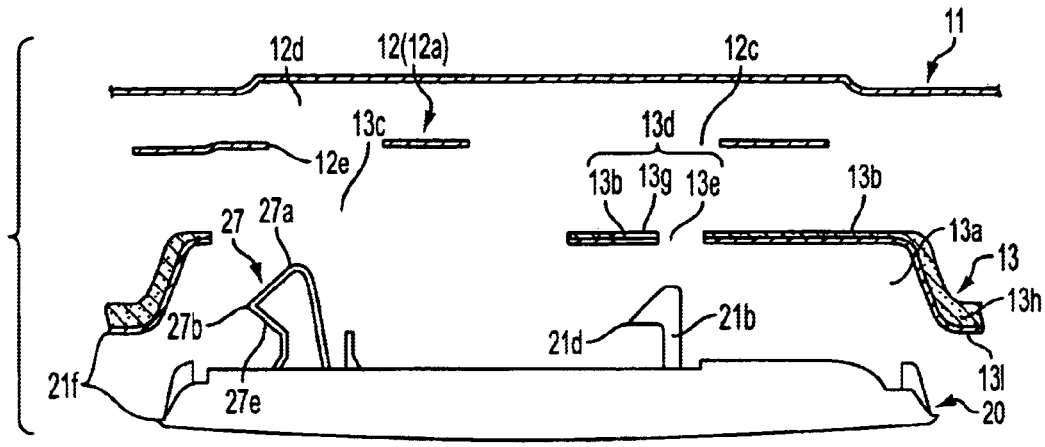
FIG. 4A is a cross sectional view of a state before being temporarily fixed.
Figure 4B:
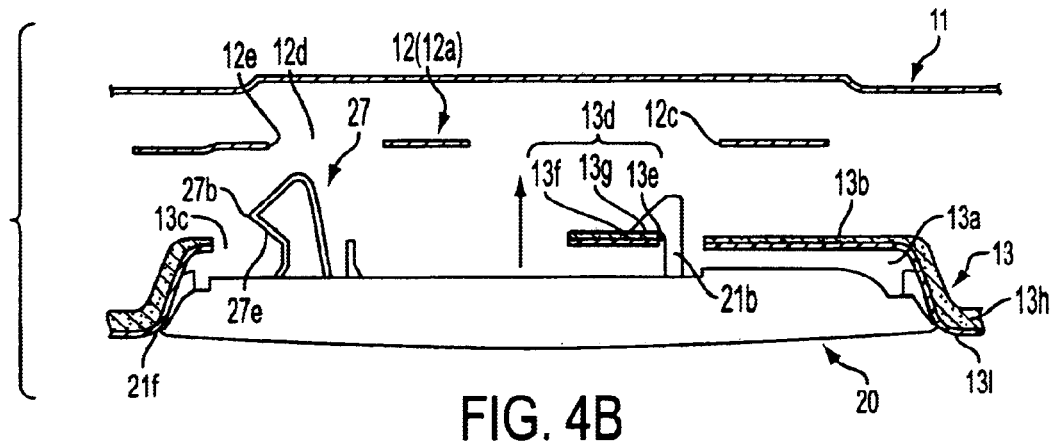
FIG. 4B is a cross sectional view of a state after being temporarily fixed.

At first, as shown in FIGS. 4(A) and 4(B), the room lamp 20 is temporarily fixed to the roof trim 13 by inserting an upper end of the engagement hook 21b from an engagement hook through hole 13e while forcibly expanding a slit 13f by the front end 21d of the engagement hook 21b and bringing a front end bottom surface of the engagement hook 21b into contact with an upper surface of a peripheral section 13g. That is, two engagement hooks 21b are respectively engaged with two engaged sections 13d of the roof trim 13, whereby the room lamp 20 and the roof trim 13 are modularized. In this instance, the slit 13f closes by itself due to a material property of the roof panel 13, a load of the room lamp 20 or the like.

Figure 4C:
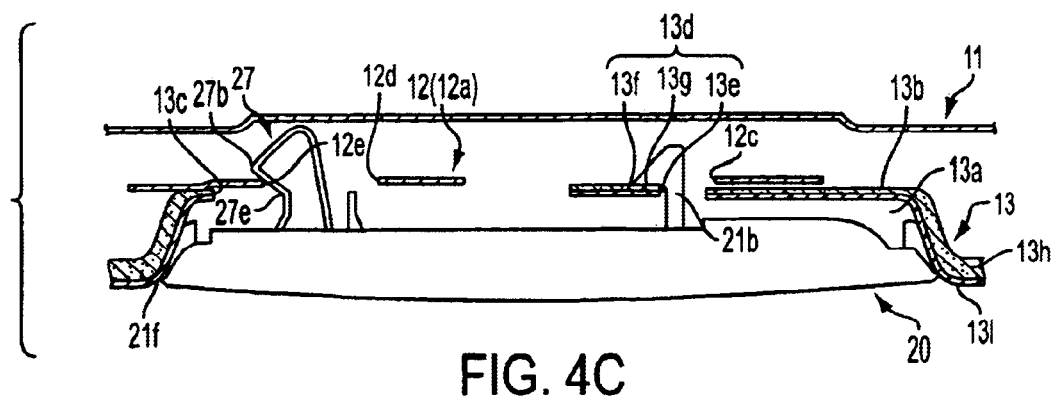
FIG. 4C is a cross sectional view of a state after being fully fixed.

Next, as shown in FIG. 4C, the room lamp 14 is fully fixed to the mounting panel 12 corresponding to the roof panel so as to be integrally formed with the roof trim 13 by respectively elastically engaging the inclined engagement surfaces 27e of two elastic engagement hooks 27 with two engaged sections 12e.

Figure 5A:
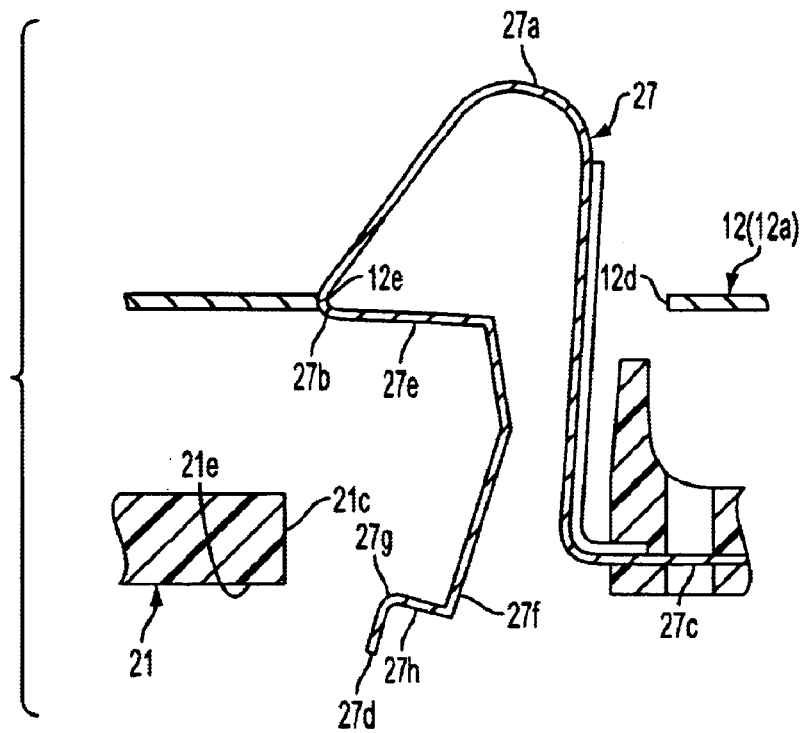
FIG. 5A is an enlarged cross sectional view of a main section in a state immediately before the fully fixing is completed by an elastic engagement hook.

At this time, since another end 27d of the elastic engagement hook 27 is a free end, a section extending from the front end section 27b to the another end 27d is displaced to a side of the one end 27c while a circular arc of the upper end 27a becomes small so as to be guided along a circular arc shape and an inclined shape extending from the upper end 27a of the elastic engagement hook 27 to the front end section 27b, as shown in FIG. 5A.

Figure 5B:
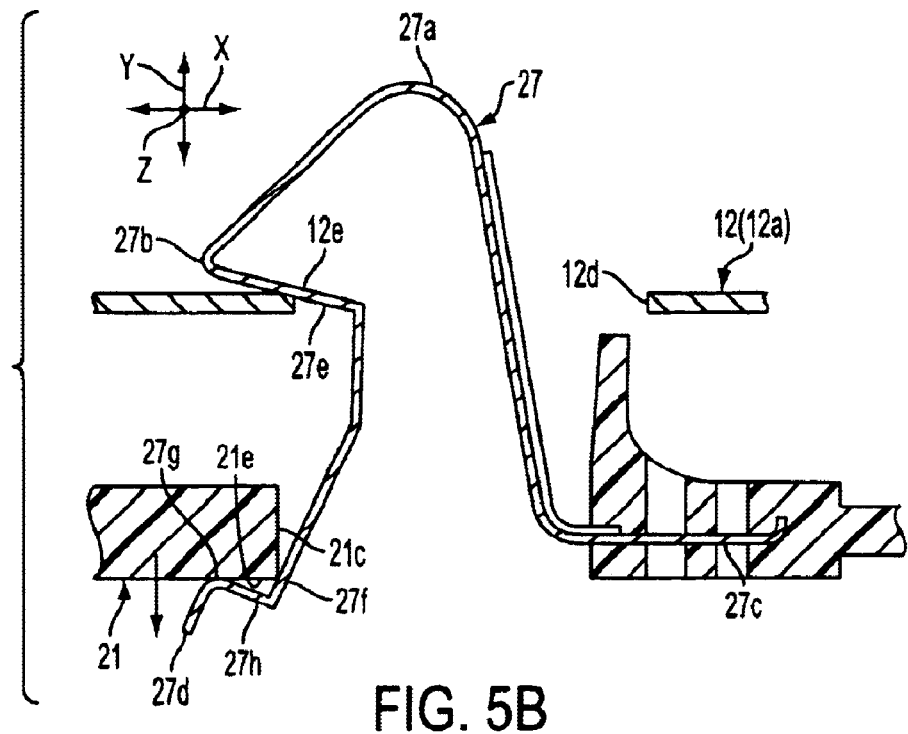
FIG. 5B is an enlarged cross sectional view of a main section in a state in which the fully fixing is completed by the elastic engagement hook.

Further, when the front end section 27b of the elastic engagement hook 27 extends through an elastic engagement hook inserting recess section 12d of the mounting panel 12, a deformed section is elastically returned as shown in FIG. 5B, and the inclined engagement surface 27e is elastically engaged with engaged section 12e in a state of being inclined with respect to the mounting panel 12. Further, as the same time, the drop-out preventing piece 27f is brought into contact with a lower corner of the peripheral edge section bottom surface 21e in a state of being inclined with respect to the lamp housing 21. Further, the contact section 27g is brought into contact with the peripheral edge section bottom surface 21e via the inclined section 27h in a state of being inclined with respect to the lamp housing 21.

As mentioned above, in the room lamp for the vehicle according to this embodiment, the inclined engagement surface 27e of the elastic engagement hook 27 is elastically engaged with the engaged section 12e in a state of being inclined with respect to the plate surface of the mounting panel 12. That is, as shown in FIG. 5(B), the inclined engagement surface 27e is elastically engaged with the engaged section 12e in a state of being upward inclined toward the side of the front end section 27b so as to extend between the upper surface side and the bottom surface side of the mounting panel 12.

As a result, the room lamp for the vehicle according to this embodiment can absorb an error of a three-dimensional relative positional relation between the elastic engagement hook 27 and the engaged section 12e. That is, as shown in FIG. 5(B), the errors of the relative positional relations in an X direction (a right and left horizontal direction) and a Y direction (an upper and lower vertical direction) can be absorbed by the deflection of the inclined engaged surface 27e. Further, the error of the relative positional relation in a Z direction (a direction orthogonal to the X direction and the Y direction mentioned above) can be absorbed by a mutual slip between the inclined engagement surface 27e and the engaged section 12e. Accordingly, in the room lamp for the vehicle according to this embodiment, the inclined engagement surface 27e can be easily and securely brought into contact with the engaged section 12e without necessity of strictly securing the three-dimensional relative positional relation between the elastic engagement hook 27 and the engaged section 12e.

Accordingly, the room lamp for the vehicle according to this embodiment can fully fix the room lamp 20 to the mounting panel 12 in an easy and securely manner so as to be integrally formed with the roof trim 13, in a fully fixing operation which can not be visually observed by an operator due to the structure of the ceiling of the vehicle body or the like.

Further, in the room lamp for the vehicle according to this embodiment, since the elastic engagement hook 27 is constituted by the leaf spring, it is easy to bent the respective sections 27a to 27g in the elastic engagement hook 27 in a state of securing a comparatively strong elastic force. Further, it is not necessary to strictly consider the absorption (a spring back or the like) of the error in the inclined engagement surface 27e, and it is possible to inexpensively manufacture the elastic engagement hook 27.

Further, in the room lamp for the vehicle according to this embodiment, the drop-out preventing piece 27f in the free end section of the elastic engagement hook 27 is brought into contact with the lower corner of the peripheral edge section bottom surface 21e in the lamp housing 21 in a state of being inclined with respect to the lamp housing 21 at a time when the inclined engagement surface 27e is elastically engaged with the engaged section 12e of the mounting panel 12. Accordingly, in the room lamp for the vehicle according to this embodiment, the elastic engagement hook 27 having a high rigidity can be obtained, and it is possible to fully fix the room lamp 21 by the elastic engagement hook 27 having a high rigidity.

Further, in the room lamp for the vehicle according to this embodiment, the contact section 27g is brought into contact with the peripheral edge section bottom surface 21e via the inclined section 27h in a state of being inclined with respect to the lamp housing 21. As a result, when the load given from the room lamp 20 is applied to the contact section 27g in a direction of a solid arrow in FIG. 5(B), by the inclined section 27h between the drop-out preventing piece 27f and the contact section 27g, the inclined section 27h is bent in the horizontal direction. Accordingly, it is possible to maintain a holding force (a lift-up force) of the elastic engagement hook 27 applied by the load from the room lamp 20 high.

Further, since the room lamp for the vehicle according to this embodiment is structured such that the contact section 21f is provided in the periphery of the lamp housing 21, the contact section 21f is brought into contact with the roof trim 13 at a time of assembling the room lamp 20 in the ceiling of the vehicle body.

At this time, when the roof trim 13 is comparatively hard, it is possible to securely position the room lamp 20 in the vertical direction of the vehicle body in consort with the elastic engagement hook 27 only by bringing the contact section 21e into contact with the wall surface close to the open end of the lamp receiving recess section 13a, whereby it is possible to absorb a play of the room lamp 14.

Further, when the roof trim 13 is comparatively soft, it is possible to further securely position the room lamp 14 in the vertical direction of the vehicle body in consort with the elastic engagement hook 27 only by bringing the contact section 21e into contact with the wall surface close to the open end of the lamp receiving recess section 13a so as to eat into therewith, it is possible to sufficiently absorb with respect to the size error between the room lamp 14 and the ceiling of the vehicle body, and it is also possible to absorb a play of the room lamp 14.

In this instance, in the embodiment mentioned above, there is disclosed a structure in which the elastic engagement hook 27 is constituted by the leaf spring, however, in the present invention, when there is considered a relation of engagement between the inclined engagement surface 27e and the engaged section 12e, it is possible to form by a resin integrally formed with the lamp housing 21, a rubber or the like.

That is, the engagement hook 21b which temporarily fixes is integrally formed with the lamp housing 21 and the elastic engagement hook 27 which fully fixes is formed by the independent member from the lamp housing 21, because a difference of height of the room lamp 20 generated between the temporarily fixing time and the fully fixing time can be absorbed.

On the contrary, since the inclined engagement surface 27e according to the present invention is elastically engaged with the engaged section 12e in a state of being inclined with respect to the mounting panel 12 at a time of fully fixing, it is possible to sufficiently absorb the difference of height between the temporarily fixing time and the fully fixing time. Accordingly, according to the present invention, it is possible to form the elastic engagement hook 27 by the resin integrally formed with the lamp housing 21, the rubber or the like.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A room lamp for a vehicle comprising:

a lamp main body;

a roof trim having a plurality of first engaged sections;

a plurality of first engagement hooks protruded from said lamp main body, and configured to respectively engage with the plurality of first engaged sections of the roof trim to fix the lamp main body to the roof trim; and a plurality of second engagement hooks protruded from said lamp main body;

and configured to respectively elastically engage with a plurality of second engaged sections in a roof panel of the vehicle to fix said lamp main body fixed to the roof trim to said roof panel, wherein each of said second engagement hooks comprises an inclined engagement surface which is elastically engaged with said second engaged section in a state of being inclined with respect to said roof panel.

2. The room lamp for a vehicle according to claim 1, wherein each of said second engagement hooks is constituted by a bent leaf spring in which a fixed end section in one end is fixed to said lamp main body, a free end section in another end being free with respect to said lamp main body, and said inclined engagement surface is in a position between the fixed end section and the free end section.

3. The room lamp for a vehicle according to claim 2, wherein a drop-out preventing piece, brought into contact with said lamp main body at a time when said inclined engagement surface is elastically engaged with the second engaged section of said roof panel, is formed in said free end section of each of said second engagement hooks.

4. The room lamp for a vehicle according to claim 3, wherein a contact section, brought into contact with said lamp main body at a time when said drop-out preventing piece is brought into contact with said lamp main body, is farmed in said another end side of said leaf spring, and an inclined section, inclined with respect to said lamp main body, is formed between the contact section and said drop-out preventing piece.

5. The room lamp for a vehicle as claimed in claim 1, wherein said roof trim is constituted by a base member positioned in a side of said roof panel, and a mounting member positioned in an inner side of a passenger room.

6. The room lamp for a vehicle according to claim 5, wherein a foamed urethane is employed for said base member, and at least one of a felt, a resin, and or a non woven fabric is employed for said mounting member.

7. The room lamp for a vehicle according to claim 5, wherein a foamed urethane is employed for said base member and a sheet fabric is employed for said mounting member.

8. The room lamp for a vehicle according to claim 1, wherein a contact section brought into contact with said roof trim is formed in a periphery of said lamp main body.

9. A vehicular room lamp for use in a vehicle, comprising:

a lamp main body;

a first plurality of engagement hooks protruded from said lamp main body; and a second plurality of engagement hooks protruded from said lamp main body, said second plurality of engagement hooks being elastic;

wherein said first plurality of engagement hooks are configured to respectively engage with a first plurality of engaged sections formed in a vehicle roof trim, whereby said lamp main body is temporarily fixed to said roof trim, wherein said second plurality of said engagement hooks are configured to respectively elastically engage with a second plurality of engaged sections formed in a mounting panel positioned in a vehicle roof, whereby said lamp main body that has been temporarily fixed to said roof trim is fully fixed to said mounting panel, wherein each of said second plurality of said engagement hooks comprises an inclined engagement surface that engages with said second plurality of engaged sections of said mounting panel in a manner that said inclined engagement surface is inclined with respect to said mounting panel.

* * * * *